United States Patent [19]

Sublette et al.

[11] Patent Number: 4,879,240

[45] Date of Patent: Nov. 7, 1989

[54] MICROBIAL CONTROL OF HYDROGEN SULFIDE PRODUCTION BY SULFATE REDUCING BACTERIA

[75] Inventors: Kerry L. Sublette, Tulsa, Okla.; Maron E. Woolsey, Tulsa, Okla.; Francis S. Manning, Tulsa, Okla.; Anne D. Montgomery, San Antonio, Tex.; Michael J. McInerney, Norman, Okla.

[73] Assignee: Combustion Engineering, Inc., Windsor, Conn.

[21] Appl. No.: 221,152

[22] Filed: Jul. 19, 1988

[51] Int. Cl.$^4$ ............................................... C12N 1/20
[52] U.S. Cl. ................................. 435/252.1; 435/262; 435/282; 435/168
[58] Field of Search ....................... 435/253, 282, 262

[56] References Cited

U.S. PATENT DOCUMENTS

| | | | |
|---|---|---|---|
| 3,020,205 | 2/1962 | Jensen | 435/262 |
| 4,596,778 | 6/1986 | Hitzman | 435/253 |
| 4,760,027 | 7/1988 | Sublette | 435/262 |

*Primary Examiner*—Peter D. Rosenberg
*Attorney, Agent, or Firm*—Richard H. Berneike

[57] ABSTRACT

Mutant strains of *Thiobacillus denitrificans* are used to inoculate an environment containing sulfate and sulfate-reducing bacteria to control the net formation of sulfide. The mutant strains are tolerant of significant concentrations of soluble sulfides and may also be tolerant of glutaraldehyde which is a biocide effective against sulfate-reducing bacteria and which may also be added to the environment. One environment for use of the invention is in a water injection well for the secondary production of petroleum and another is the control of sulfide production in the treatment of waste materials.

10 Claims, 1 Drawing Sheet

MICROBIAL CONTROL OF HYDROGEN SULFIDE PRODUCTION BY SULFATE REDUCING BACTERIA

BACKGROUND OF THE INVENTION

The corrosion of iron and steel as well as concrete and limestone is a wide-spread problem. The cost to governments as well as private industry to replace or repair pipelines, storage tanks, pumps, and other systems that have been damaged by corrosion is substantial. Most corrosion is caused by microbial processes, whether directly or indirectly. Corrosion in general and microbial corrosion in particular are complex processes and seldom, if ever, involve a single mechanism or a single microbial species.

Corrosion may be defined as the destructive attack on metals by some chemical or electrochemical mechanism. In aqueous solution, or in humid environments, bulk metals (M) tend to ionize giving up electrons (e⁻) (Equation 1):

$$M \rightarrow M^n + ne^- \tag{1}$$

The area on the metal surface where this reaction takes place is called the anode. Corrosion occurs when electrons are removed from the metal increasing the net ionization of the metal. The two principal mechanisms for the removal of electrons are an excess of hydrogen ions (H+) (Equation 2):

$$2H^+ + 2e^- \rightarrow 2H \rightarrow H_2 \tag{2}$$

or oxygen (Equation 3):

$$H_2O + 1/2O_2 + 2e^- \rightarrow 2(OH)^- \tag{3}$$

Areas on the metal surface where these reactions occur are referred to as cathodic areas. In order for significant corrosion to occur, the anodic and cathodic reactions must remain in balance and the electrolytic cell must continue functioning over an extended period of time. In microbial corrosion, the corrosive effects are thought to be the result of one or more of the following mechanisms:

(1) direct chemical action of metabolic products such as sulfuric acid, inorganic or organic sulfides, and chelating agents such as organic acids;

(2) cathodic depolarization associated with anaerobic growth;

(3) changes in oxygen potential, salt concentration, pH, etc., which establish local electrochemical cells; and (4) removal of corrosion inhibitors (oxidation of nitrite or amines) or protective coatings (bitumen on buried pipes).

Several microbial species may be involved in these processes, either alone or as components of consortia.

In an anaerobic environment, corrosion is most commonly attributed to the growth of dissimilatory sulfate-reducing bacteria (SRB). This group of bacteria is responsible for possibly 50% of all instances of corrosion. Corrosion of steel caused by sulfate-reducing bacteria is characterized by pitting of the metal, with the pits being open and filled with soft black corrosion products in the form of iron sulfides. When the iron sulfide is removed, the metal underneath is bright. Pitting corrosion in aluminum and copper alloys have also been reported. With cast iron, graphitization occurs. The iron is dissolved away leaving the graphite skeleton of the pipe apparently unaffected. Twenty-five years ago, the underground corrosion of iron or steel gas or water pipes cost about one-half to two billion dollars per year. Today, these costs are significantly greater.

As noted above, when oxygen is not available for the removal of electrons from the metal surface, an alternative cathodic reaction is necessary for corrosion to occur. In 1934, von Wolyogen Kuhr and van der Vlugt (Water, 18. 147) suggested that sulfate-reducing bacteria contribute directly to the corrosion of iron by the removal and utilization of hydrogen available at the cathodic areas of the metal for the reduction of sulfate to sulfide. They proposed the following mechanism of cathodic depolarization:

Anodic Reaction   $Fe \rightarrow Fe^{+2} + 2e^-$

$H_2O \rightarrow H^+ + OH^-$

Cathodic Reaction   $2H^+ + 2e^- \rightarrow H_2$

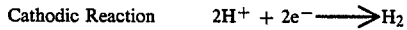

Cathodic Depolarization   $SO_4^{-2} + 4H_2 \xrightarrow{SRB} S^{-2} + 4H_2O$

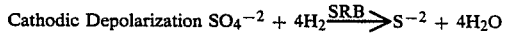

The production of inorganic sulfide in the cathodic depolarization reaction is itself very important to the problem of microbially induced corrosion. Sulfate reducing bacteria are the major source of hydrogen sulfide in the biosphere. Hydrogen sulfide is highly toxic and quite corrosive chemically in an aqueous environment. Since this theory of cathodic depolarization was proposed, most of the literature on microbial corrosion has been concerned with testing its validity. For example see: Booth & Tiller, Trans. Faraday Soc., 56, 1689 (1960) and 58. 2510 (1962); Booth et al. Congr. Intern. Corros. Marine Salissures, 363, CREO Paris (1964); Booth et al. Chem. Ind., 49. 2084 (1967); King & Miller, Nature, 233. 491 (1971); Iverson, Nature, 217. 1265 (1968); Iverson, Underground Corrosion (Ed. Escalante), p. 33-52, Tech. Pub. 741, ASTM (a981).

The sulfate reducing bacteria are a taxonomically diverse group of bacteria. In the mid-sixties, only two genera were identified, Desulfovibrio and Desulfotomaculum. The genus Desulfovibrio is the most studied of the genera. The Desulfovibrio species are usually mesophilic, relatively easy to isolate and they do not form spores. Most species of Desulfovibrio contain c-type cytochromes and the chromatophore desulfoviridin. Desulfotomaculum species are either mesophilic or thermophilic. The common thermophilic species, *Desulfotomaculum nigrificans* was originally called *Clostridium nigrificans*. The formation of spores is restricted to and a characteristic of the genus Desulfotomaculum. Widdel and Pfenning (Arch. Microbiol., 131. 360, 1982) recently described five new genera of sulfate-reducers (Desulfobacter. Desulfobulbus. Desulfococcus. Desulfonema and Desulfosarcina) which are not only morphologically distinct, but also nutritionally diverse.

The metabolic capabilities of the dissimilatory sulfate-reducing bacteria in the presence of sulfate show great variation both among genera, and within certain genera, such as Desulfovibrio. Sulfate-reducers have been shown to use a wide range of carbon compounds as electron donor including alcohols, organic acids such as lactate, pyruvate and benzoate, and fatty acids from formate to stearate. Many of the Desulfovibrio species such as *D. desulfuricans, D. gigas,* and *D. sapovorans,* as well as *Desulfotomaculum nigrificans* degrade lactate and pyruvate to acetate and reduce sulfate to sulfide. Other species completely oxidize long-chain fatty acids as well as aromatic acids to $CO_2$. Hydrogen also serves as the electron donor for many species and these bacteria can participate in interspecies hydrogen transfer reactions by utilizing the $H_2$ produced by the fermentative bacteria. In addition to utilizing $H_2$, some sulfate reducers can also produce $H_2$ from organic molecules.

The sulfate-reducing bacteria can be found in muds, ponds, sewage, fresh and marine waters, underground aquifers, oil reservoirs, as well as the rumina of sheep and cattle and the guts of insects. These organisms flourish in polluted lakes and canals. Thermophillic sulfate-reducers are usually strains of the species *Desulfotomaculum nigrificans* and can be found in deep telluric aquifers subject to geothermal heating. Sulfate-reducers can also grow in the aqueous phase of oil and petroleum storage systems. Since many oil reservoirs have high concentrations of sulfate, sulfide production by sulfate-reducing bacteria is a major economic concern to this industry. Sulfate-reducing bacteria appear to be indigenous in oil reservoirs, although this is still being debated (see Nazina, Geomicrobiol, J., 4, 103, 1985). These organisms are readily introduced into wells during secondary oil recovery by water flooding and have been reported to penetrate between 0.6 and 2 m per year through oil-bearing sands.

Today, most experimental evidence indicates that sulfate-reducers do not oxidize hydrocarbons, but the question has not been completely settled. Recent studies have shown that anaerobic methane oxidation occurs at depths where rapid sulfate reduction occurs suggesting that these two processes are linked.

The growth of sulfate reducing bacteria in oil field water systems can be costly to the industry. It has been well established that the growth of sulfate-reducing bacteria can promote corrosion of pipelines, well casings, storage tanks, pumps, etc., plug injection wells and possibly degrade polymers (polyacrylamide and xanthum gums) and surfactants. Almost every aspect of oil recovery is affected.

Although the first study of microbially induced corrosion in pipes dates to circa 1923, the role of microorganisms as a major source of corrosion in the oil field is still not appreciated in certain quarters. The skeptic should consider the following case history. A major oil company operating an offshore platform in the far east laid a 60 mile, 23" diameter, subsea pipeline to carry production to onshore storage facilities. The crude oil contained less than 1% water. The production rate was such that laminar flow existed in the pipe and the entrained water settled to the bottom of the pipe. Unknown to the field engineers, significant microbial growth developed in the water layer and in time leaks were detected in the pipeline. Examination of the pipeline revealed holes in the underside of the pipe every 3-4 ft. Virtually, all of the pipeline had to be replaced after only four years of operation. When the pipeline was put back in operation, a program for monitoring and control of microbial growth was initiated. The new pipeline has been in operation for ten years without any indications of corrosion.

There are numerous other examples of multi-million dollar lessons in microbial corrosion, formation plugging and failure of enhanced oil recovery programs due to ineffectiveness of mobility control agents. It is impossible to operate an oil field water system under sterile conditions. However, the above case history clearly illustrates the need to minimize microbial growth in these systems.

The control of microbial corrosion in oil recovery operations generally incorporates both physical or mechanical treatment and chemical treatment. Physical methods include:

(1) choosing injection water sources to minimize sulfate-reducing bacteria inoculation;

(2) periodically pigging or scraping water lines and flushing with slugs of surfactants and solvents;

(3) avoiding commingling of waters from different course since commingling can improve the growth environment of sulfate-reducing bacteria; and (4) eliminating dead spots and reducing water handling time.

Although physical methods can made a significant contribution to the control of sulfate-reducing bacteria, the most effective control of microbial activity in an oil field water system is obtained by chemical (biocide) treatment. A number of factors are considered when choosing a biocide or biocides for an individual treatment situation. First, the biocide(s) of choice must be active against the bacteria in the water system under the conditions which exist in the system and preferably in the reservoir as well. Secondly, the biocide must be persistent in the system; that is, capable of reaching points far removed from the source while retaining activity. The injection water represents a complex chemical environment. The biocide must exhibit chemical stability in this environment. Further, the biocide must be compatible with chemical treating agents such as corrosion inhibitors, scale inhibitors, oxygen scavengers, etc. Lastly, the biocide must be economical.

Organic biocides, such as glutaraldehyde, generally offer a high degree of persistence in an oil field water system. However, the effectiveness of any organic biocide is dependent upon the water chemistry and microbiology of the system in which it is applied. A biocide may work very well in controlling sulfate-reducing bacteria in one field but be totally ineffective in another.

Sulfate-reducers are sessile bacteria; that is, they tend to attach themselves to a solid surface. In an oil field water system, sulfate-reducers are generally found in combination with slime forming bacteria in films composed of a biopolymer matrix embedded with bacteria. The interior of these films is anaerobic and highly conducive to the growth of sulfate reducing bacteria even if the surrounding environment is aerobic. If a biocide is to be effective against sessible bacteria, penetration and absorption by the biofilm which protects these bacteria is required. Therefore, much higher concentrations of costly biocide are required to control bacteria embedded in a biofilm than planktonic or free-floating cells of the same species.

The physical and chemical control of the growth of sulfate-reducing bacteria represents a significant and on-going expense in any oil field operation as well as in other operations where the production of $H_2S$ is a problem. More effective methods of controlling sulfate-reducing bacteria and biogenic hydrogen sulfide production and accumulation are needed.

SUMMARY OF THE INVENTION

The present invention describes a process for the microbial control of $H_2S$ production utilizing the bacterium *Thiobacillus denitrificans*. The invention comprises the use of mutant strains of *Thiobacillus denitrificans* which are more tolerant of soluble sulfide ($S^{-2}$, $HS^-$, $H_2S$) and which also may be more tolerant of a biocide effective against sulfate-reducing bacteria than the wild-type organism in a process by which environments contaminated with sulfate reducing bacteria are treated with said mutant strains of *T. denitrificans* with or without co-treatment with glutaraldehyde to prevent the net formation of sulfide ($S^{-2}$), bisulfide ($HS^-$) or hydrogen sulfide ($H_2S$). More particularly, he invention utilizes mutant strains of *T. denitrificans* to oxidize sulfide produced by sulfate-reducing bacteria to sulfate, thereby reducing or preventing the net formation of sulfide. Incorporated in the present invention is the option of combining microbial control of sulfide production by *T. denitrificans* with inhibition of sulfate-reducing bacteria with the biocide glutaraldehyde. The invention is particularly applicable to the control of sulfide production in a water injection well in the secondary production of petroleum but it is also applicable to the control of sulfide production in other situations such as the treatment of waste materials containing sulfate-reducing bacteria.

DETAILED DESCRIPTION OF THE PREFERRED EMBODIMENTS be 5-8 mmoles/hr-g biomass under anaerobic conditions and 15-21 mmoles/hr-g biomass under aerobic conditions. Bartolerance of *T. denitrificans* to 1800 psig as well as a relative insensitivity to pressurization-depressurization cycles has also been demonstrated.

Sulfide and biocide resistant strains of *Thiobacillus denitrificans* for use in the present invention were isolated by enrichment from cultures of wild-type *T.denitrificans* (ATCC 3642). First, a number of commercially available biocides were initially screened for the purposes of identifying any inherent resistance of wild-type *T. denitrificans* to low levels of the biocides (1-5 ppm). Low level resistance was observed only with biocides having the active ingredient glutaraldehyde such as Arco Chemical Co. B-648 and B-649 biocides. By repeated subculturing of resistant cultures at increasing concentrations of biocide using standard subculturing techniques, strains were obtained which were capable of growth in thiosulfate medium at an initial concentration of glutaraldehyde of 40 ppm.

Tests indicate that exposure of the wild type to 12 ppm of glutaraldehyde resulted in 100% loss of viability. A comparison shows that the glutaraldehyde resistant strains are capable of growth in the presence of glutaraldehyde at concentrations which are lethal to the wild type. Although the glutaraldehyde resistant strains were capable of growth in thiosulfate medium with initial concentrations of glutaraldehyde of up to 40 ppm, the actual level at which growth takes place is probably lower. However, glutaraldehyde concentrations of only 7-12 ppm are typically used to control the growth of sulfate reducing bacteria.

TABLE 1

| STOICHIOMETRY OF $H_2S$ OXIDATION BY *THIOBACILLUS DENTRIFICANS*[a] | | | | | | | |
|---|---|---|---|---|---|---|---|
| Reactor Type | Electron Acceptor | $NO_3^-/H_2S$ (mole/mole) | $O_2/H_2S$ (mole/mole) | $SO_4^{-2}/H_2S$ (mole/mole) | $NH_4^+/H_2S$ (mole/mole) | $OH^-/H_2S$ (eq/mole) | Biomass/$H_2S$ (g/mole) |
| Batch CSTR | $NO_3^-$ | 1.36 | | 1.04 | 0.12 | 1.60 | 12.1 |
| D = 0.029 hr$^{-1}$ CSTR | $NO_3^-$ | 1.30 | | 1.03 | 0.09 | 1.37 | 9.3 |
| D = 0.058 hr$^{-1}$ | $NO_3^-$ | 1.19 | | 1.00 | 0.10 | 1.24 | 12.9 |
| Batch CSTR | $O_2$ | | 1.81 | 0.99 | 0.10 | 1.75 | 4.5 |
| D = 0.030 hr$^{-1}$ CSTR | $O_2$ | | | 1.06 | 0.11[b] | 2.38[b] | 8.1 |
| D = 0.053 hr$^{-1}$ | $O_2$ | | | 1.04 | 0.12 | 1.77 | 7.9 |

[a]Average of three or more determinations unless otherwise noted.
[b]Average of two determinations.

Figure 1:
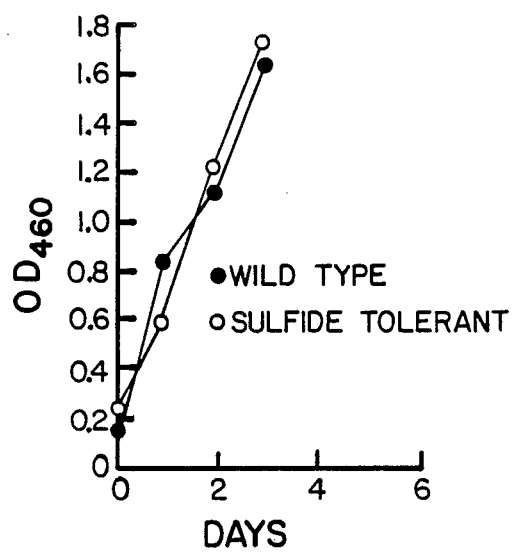
FIGS. 1 to 4 are graphs which illustrate the effect of sulfide on the growth of wild type and sulfide tolerant strains of *T. denitrificans*.
Figure 2:
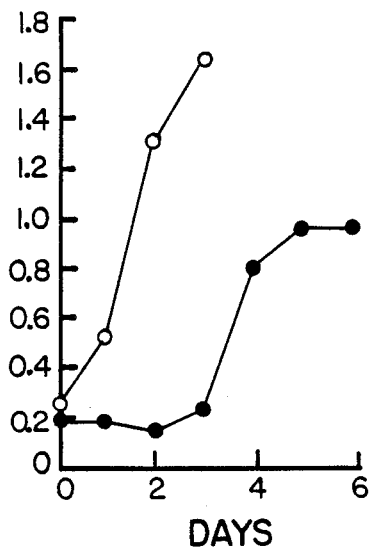
Figure 3:
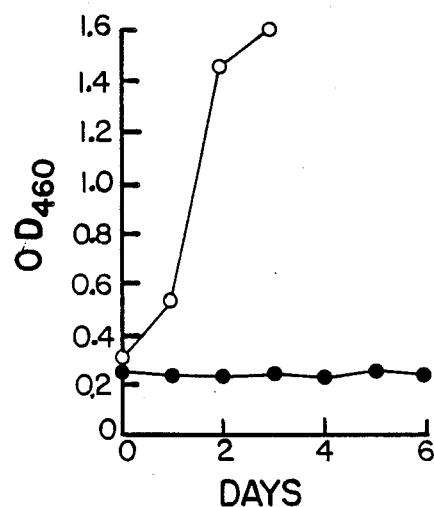
Figure 4:
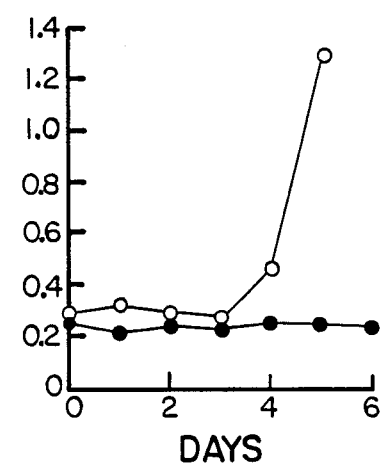

*Thiobacillus denitrificans* is a strict autotroph and faculative anaerobe first described in detail by Baalsrud and Baalsrud (Arch. Mikrobiol. 20. 34, 1954). Under anaerobic conditions, nitrate may be used as a terminal electron acceptor with reduction to elemental nitrogen. It has been demonstrated that wild-type *T. denitrificans* may be readily cultured aerobically or anaerobically on hydrogen sulfide as an energy source under sulfide limiting conditions. Under these conditions, hydrogen sulfide is oxidized completely to sulfate. Hydrogen sulfide, however, is an inhibitory substrate with inhibition of growth observed at sulfide concentrations in excess of 100-200 μM. Total inhibition of growth is observed at about 1000 μM. The stoichiometry of both the aerobic and anaerobic oxidation of $H_2S$ by *T. denitrificans* is summarized in Table 1 for a batch reactor and for continuous stirred tank reactors (CSTR) at different dilution rates (D=q/v where q is the volumetric flow rate of nutrient and v is the culture volume). The maximum bio-oxidation capacity of the *T. denitrificans* biomass for $H_2S$ oxidation has been determined to In order to incorporate both glutaraldehyde and sulfide tolerance into one strain, glutaraldehyde resistant strains were repeatedly subcultured in the presence of increasing concentrations of sulfide (up to 1000 μM) in thiosulfate medium by conventional subculturing techniques. Double mutant strains were readily developed which exhibited high tolerance of sulfide as well as glutaraldehyde resistance. The sulfide tolerance is illustrated by the graphs of FIGS. 1 to 4 in which the concentration of cells of the bacteria is represented by the optical density at a wavelength of 460 nanometers and is plotted against the days of incubation at 30° C. and pH 7.0. FIG. 1 has an initial sulfide concentration of 0 μM; FIG. 2 of 825 μM; FIG. 3 of 1000 μM; and FIG. 4 of 1500 μM.

The ability of the sulfide tolerant strain of *T. denitrificans* to control the biogenic production of sulfide was demonstrated by co-culturing this strain with sulfate reducing bacteria such as *Desulfovibrio desulfuricans* in liquid cultures and in porous sandstone cores. In all cultures, lactate served as electron donor for the sulfate reducing bacteria and sulfate as the electron acceptor. Biogenic sulfide was the electron donor for the T. denitrificans and nitrate the electron acceptor. The growth medium also contained mineral salts and vitamins. This medium was shown to support the growth of either the sulfate reducing bacteria of T. denitrificans (with thiosulfate added as an electron donor) alone.

When D. desulfuricans was grown alone and in co-culture with wild-type T. denitrificans, high amounts of sulfide were produced in all pure cultures of D. desulfuricans and in all co-cultures containing the wild-type strain of T. denitrificans (Table 2). Co-cultures inoculated with 0.3 ml of a wild-type T. denitrificans suspension had lower sulfide levels than co-cultures inoculated with 0.1 ml and 0.2 ml, indicating that large numbers of cells were needed before sulfide production was diminished. When D. desulfuricans was grown in co-culture with the sulfide tolerant strain, little or no sulfide was produced. The small amount of sulfide which was produced after 14 days (4.0 mg/L) in the culture with the smallest inoculum of the sulfide tolerant strain disappeared after 19 days. These test results are presented in the following Table 2:

TABLE 2

Sulfide Production by D. desulfuricans Grown With and Without the Wild-Type or Mutant Strain of T. denitrificans

| Culture | T. denitrificans Inoculum Size | Sulfide Concentration (mg/l) after: | |
|---|---|---|---|
| | | 14 days | 19 days |
| DD alone | 0 | 15.8 | 14.2 |
| DD + wt | 0.1 | 28.0 | 28.8 |
| | 0.2 | 51.5 | 43.5 |
| | 0.3 | 22.5 | 19.5 |
| DD + St | 0.1 | 4.0 | 0 |
| | 0.2 | 0 | 0 |
| | 0.3 | 0 | 0 |
| wt alone | 0.1 | 0 | 0 |
| St alone | 0.1 | 0 | 0 |

Abbreviations:
DD = D. desulfuricans
wt = wild-type T. denitrificans
St = Sulfide tolerant T. denitrificans In each culture where sulfide was detected, a black precipitate of iron sulfide was also present and was absent in those tubes where no sulfide was found. These experiments were repeated several times with similar results. The addition of a known amount of sulfide to a sample from these cultures showed that the co-cultures did not contain any substances that could not have interfered with the colorimetric assay used for sulfide analysis. Similar results have been obtained using a consortium of sulfate reducing bacteria produced by enrichment from an oilfield brine.

In order to show that the sulfide tolerant strain of T. denitrificans was actually oxidizing sulfide to sulfate by reducing nitrate, a balance of substrates and products of metabolism was performed on the sulfide producing cultures with and without the sulfide tolerant strain. With an initial lactate concentration of 1.5 mM, one would expect 1.5 mM acetate and 0.75 mM sulfide to be produced if all lactate is utilized by D. desulfuricans. Values of 1.4 mM acetate (95% recovery) and 0.6 mM sulfide (83% recovery) were found. In co-culture with the sulfide tolerant strain, lactate was completely utilized and a concommitent decrease in nitrate was observed indicating the growth of both D. desulfuricans and the sulfide tolerant strain of T. denitrificans. No sulfide was detected either visually (as iron sulfide) or colorimetrically. The final sulfate concentration was the same as the starting concentration indicating that the sulfide tolerant strain stoichiometrically oxidized the sulfide produced by D. desulfuricans to sulfate.

In cultures containing organisms enriched from the oilfield brine, similar results were observed, except there was no acetate detected. Approximately 50% more sulfide was detected in cultures without the sulfide tolerant strain than in cultures of D. desulfuricans alone. This could suggest the presence of sulfate-reducing bacteria that can use acetate, or some other acetate user which produces $H_2$ for sulfate-reducers capable of growing on hydrogen. When the sulfide tolerant strain was grown with the brine consortium, sulfide was not detected, there was a decrease in nitrate concentration and sulfate concentration was approximately the same as the starting concentration. Thus, the sulfide tolerant strain was able to grow and effectively utilize all sulfide produced in an enrichment from an actual environmental sample and effectively compete with any denitrifiers which may have been present.

The sulfide tolerant strain of T. denitrificans and sulfate reducing bacteria were also co-cultured in Berea sandstone cores to demonstrate the effectiveness of the sulfide tolerant strain in preventing biogenic sulfide production in a reservoir-like environment. Small cores were cut from blocks of Berea sandstone into cylinders and autoclaved at 121° C. for 30 min. while submerged in growth medium without trace metals. The autoclaving increases the permeability. The permeability of each core was then determined and only cores having permeabilities of 500 mdarcys or greater were used. Growth medium was used in determining the permeabilities of each core so that each core was saturated with growth medium. Each core was then mounted between two flasks (A and B), each containing the growth medium described previously. The contents of each flask was in contact with one face of the Berea core. These growth chambers were autoclaved, placed inside of the anaerobic glove box, and trace metals were added to each flask. Flask A was then inoculated with the appropriate culture(s). An approximate penetration time defined as the days required for growth to appear in flask B after inoculation of flask A was determined for each culture.

When grown in pure culture, both wild-type and the sulfide tolerant strain of T. denitrificans had penetration times of 17 days. Growth through cores was observed in pure cultures of D. desulfuricans and the brine consortium after 25 and 22 days, respectively. In co-culture, growth of the sulfide tolerant strain with D. desulfuricans was observed after 25 days when the growth chamber was autoclaved twice, and at 70 days when the growth chamber was autoclaved only once. In both instances, T. denitrificans appeared in flask B at the same time as D. desulfuricans indicating it grew along with the sulfate reducer. Sulfide production was apparent in flask A of D. desulfuricans alone and of the brine consortium alone. Iron sulfide was observed and soluble sulfide determined colorimetrically in flask B of these cultures approximately 3 days after growth was seen. No black precipitate was ever observed and no sulfide detected in either flask of the growth chamber in the sulfide-producing cultures when the sulfide tolerant strain was present. After the liquid phase of flask B of each growth chamber was analyzed, each core was broken open and crushed. A black precipitate of iron sulfide was observed in each core containing *D. desulfuricans* alone and the brine consortium alone. When cores grown with *D. desulfuricans* plus the sulfide tolerant strain were broken open and crushed, no black precipitate was present. These results are summarized in the following Table 3.

TABLE 3

| Culture | Penetration Time (days) | Sulfide (mM) Flask B | Black Ppt. in Core |
|---|---|---|---|
| DD[a] alone | 25 | 0.3 | + |
| DD + St[a] | 25 | 0 | — |
| DD + St | 70 | 0 | — |
| Brine consortium[a] | 22 | 0.6 | + |
| Wt | 17 | 0 | — |
| St | 17 | 0 | — |

Abbreviations:
DD = *D. desulfuricans*
St = Sulfide tolerant *T. denitrificans*
Wt = wild-type *T. dentrificans*
[a]Core was autoclaved twice before inoculated.

In summary, a sulfide and glutaraldehyde resistant strain of *T. denitrificans* has been successfully grown in co-culture with the sulfate reducing bacterium *D. desulfuricans* both in liquid culture and through Berea sandstone cores without the accumulation of sulfide. Microbial sulfide production in an enrichment from an oilfield brine was also controlled by the presence of this sulfide-tolerant strain. The effectiveness is due to the sulfide-resistant nature of the strain since it is able to grow and utilize sulfide at levels which were inhibitory to the wild-type strain of *T. denitrificans*. There are many sulfide-oxidizing bacteria, but these bacteria are usually inhibited when $H_2S$ concentrations reach a nuisance level. The sulfide tolerant strain not only proved effective in controlling sulfide in cultures of *D. desulfuricans* with lactate as the energy source, but it also proved effective in a mixture of sulfate-reducing bacteria which use lactate and products of lactate metabolism, acetate and $H_2$ for sulfide production.

The sulfide tolerant strain of *T. denitrificans* readily grew through Berea sandstone cores in pure cultures. Its penetration time was roughly 0.4 cm/day which is much faster than that observed for *D. desulfuricans* and the organisms present in the oilfield brine enrichment. The sulfide tolerant strain and the sulfide-producing organisms apparently grew through the core together since, when checked microscopically, organisms morphologically similar to *D. desulfuricans* and *T. denitrificans* could be seen in flask B from growth chambers inoculated with these two strains. This is important because it suggests that the sulfide tolerant strain was utilizing sulfide as it was being produced thus not allowing a buildup of sulfide to occur. The slow penetration times of *D. desulfuricans* observed suggests that *Desulfovibrio* species do not readily grow through sandstone. This seems to be a general property of sulfate-reducing bacteria since the various kinds of sulfate-reducers present in the oilfield brine enrichment also slowly penetrated through the cores. After growth of *D. desulfuricans* through the cores, sulfide accumulation was largely concentrated at the face of the cores, even though nutrients were available throughout the core. If this is the case in a natural environment, sulfide accumulation may be a more localized problem than previously thought. The introduction of sulfate-reducing bacteria deep into an underground formation by water flooding may not be a major source of these organisms in oil reservoirs. Instead, sulfate-reducing bacteria may be indigenous to these environments and their activity is stimulated by oil recovery operations. It is interesting to note that plugging of injection wells by biofilm development is also a localized phenomenon. Thus, remediation techniques such as the use of the sulfide tolerant strain to remove sulfide may only involve treatment in the area near the wellbore since the activity is only observed in this area.

The ability of *T. denitrificans* to readily grow through such formations makes it very useful in the control of sulfide accumulation. Because the sulfide tolerant strain *T. denitrificans* is a chemoautotrophic bacterium, no additional organic nutrients need to be added to support its growth. This will limit the growth of any indigenous organisms present which might require such various organic nutrients. Because it is a facultative anaerobe, *T. denitrificans* could be used not only in strictly anaerobic environments, but may be effective at utilizing $H_2S$ which diffuses into an aerobic zone. Anaerobic corrosion by sulfate reducing bacteria occurs at neutral pH which is optimum for growth of *T. denitrificans*. *T. denitrificans* grows optimally at 30° C., and growth rate quickly drops at higher temperatures. Temperatures in excess of 40° C. are totally inhibitory to growth. Many thermophillic sulfate-reducing bacteria have been identified and *T. denitrificans* would not be effective in environments where such organisms would be found. Another limiting factor in the growth of *T. denitrificans* is salt concentration. When 1% sodium chloride was added to cultures of *T. denitrificans*. growth was inhibited by 30% after 72 hours of incubation. When the salt concentration was raised to 2%, growth was inhibited 82%. Similar results were obtained when potassium chloride was present in similar amounts (1.28% and 2.56%, respectively). Total inhibition of growth was observed when 3% NaCl or 3.74% KCl was present. However, growth of *T. denitrificans* is inhibited approximately 50% when grown in media containing 0.05% lactate. Under these conditions, the sulfide tolerant strain was still effective in utilizing the sulfide produced in co-culture by sulfate-reducing bacteria. This indicates that the sulfide tolerant strain of *T. denitrificans* does not have to be growing under optimal conditions in order to utilize sulfide effectively.

As previously indicated, one of the particular applications of the invention is in the control of sulfide production in a water injection well for the secondary production of petroleum. In that situation, a suspension of a sulfide/glutaraldehyde tolerant strain of *T. denitrificans* is injected (pumped) down the water injection well. This may be accompanied by the injection of the glutaraldehyde biocide. A period of time may then be provided for the culture to incubate and migrate before the water injection begins with this time being dependent on the geological formation. The injection water may or may not need to be supplemented with nutrients for the *T. denitrificans* depending on the source and content of the injection water. For example, certain lake water may contain sufficient nitrate and phosphate to provide sufficient nutrients while other water sources may be deficient in nutrients. Once the water injection has begun, the petroleum output can be monitored for sulfide content and, if sulfides appear, additional injections of *T. denitrificans* can be made on a periodic basis as needed. In environments other than the secondary production of petroleum, such as the treatment of waste materials containing sulfate-reducing bacteria, a suspension of the *T. denitrificans* (with or without glutaraldehyde) is merely added to the waste suspension and allowed to multiply. Again, the waste suspension can be monitored for the appearance of sulfide and then re-inoculated.

What is claimed is:

1. A method of controlling the biogenic production of sulfide in an environment containing sulfate and sulfate-reducing bacteria and sulfide produced by the conversion of said sulfate by said sulfate-reducing bacteria wherein said sulfate-reducing bacteria would otherwise continue to convert said sulfate to sulfide comprising the step of introducing into said environment a strain of *Thiobacillus dentrificans* which is resistant to sulfide concentrations in excess of 200 $\mu$m.

2. A method as recited in claim 1 wherein said strain of *Thiobacillus dentrificans* is also resistant to the biocide glutaraldehyde and wherein the environment is also treated with glutaraldehyde to decrease the sulfate-reducing bacteria.

3. A method as recited in claim 2 wherein said environment comprises a water injection well for secondary petroleum recovery and wherein said step comprises injecting said strain down into said well.

4. A method as recited in claim 1 wherein said environment comprises a water injection well for secondary petroleum recovery and wherein said step comprises injecting said strain down into said well.

5. A method as recited in claim 1 and further including the step of adding nutrients for the growth of said *Thiobacillus denitrificans* to said environment.

6. A method as recited in claim 3 and further including the step of adding nutrients for the growth of said *Thiobacillus denitrificans* to said environment.

7. A method as recited in claim 4 and further including the step of adding nutrients for the growth of said *Thiobacillus denitrificans* to said environment.

8. A method as recited in claim 2 and further including the step of adding nutrients for the growth of said *Thiobacillus denitrificans* to said environment.

9. A method as recited in claim 1 wherein said environment comprises a suspension of waste materials.

10. A method as recited in claim 9 and further including the step of adding nutrients for the growth of said *Thiobacillus denitrificans* to said suspension.

* * * * *